(12) United States Patent
Wisler et al.

(10) Patent No.: US 6,703,837 B1
(45) Date of Patent: Mar. 9, 2004

(54) WELLBORE RESISTIVITY TOOL WITH SIMULTANEOUS MULTIPLE FREQUENCIES

(75) Inventors: MacMillan M. Wisler, Kingwood, TX (US); Larry W. Thompson, Willis, TX (US)

(73) Assignee: Precision Drilling Technology Services Group, Inc., Calgary (CA)

(*) Notice: Subject to any disclaimer, the term of this patent is extended or adjusted under 35 U.S.C. 154(b) by 0 days.

(21) Appl. No.: 09/662,973

(22) Filed: Sep. 15, 2000

(51) Int. Cl.⁷ .................................................. G01V 3/30
(52) U.S. Cl. ...................................... 324/338; 324/335
(58) Field of Search ................................. 324/335, 338, 324/339, 340–343

(56) References Cited

U.S. PATENT DOCUMENTS

| | | | |
|---|---|---|---|
| 3,496,455 A | | 2/1970 | Gouilloud |
| 3,893,020 A | | 7/1975 | Meador et al. |
| 4,107,598 A | | 8/1978 | Meador et al. |
| 4,383,220 A | * | 5/1983 | Baldwin ..................... 324/338 |
| 4,659,992 A | | 4/1987 | Clark et al. |
| 4,785,247 A | | 11/1988 | Meador et al. |
| 4,965,522 A | * | 10/1990 | Hazen et al. ............... 324/339 |
| 4,968,940 A | | 11/1990 | Clark et al. |
| 5,081,419 A | | 1/1992 | Meador et al. |
| 5,278,507 A | * | 1/1994 | Bartel et al. ................ 324/335 |
| 5,329,235 A | | 7/1994 | Zhou et al. |
| 5,339,036 A | * | 8/1994 | Clark et al. ................... 175/50 |
| 5,406,206 A | * | 4/1995 | Safinya et al. .............. 324/335 |
| 5,469,062 A | * | 11/1995 | Meyer, Jr. .................... 324/338 |
| 5,581,024 A | | 12/1996 | Meyer, Jr. et al. |
| 5,594,343 A | | 1/1997 | Clark et al. |
| 5,672,971 A | | 9/1997 | Meador et al. |
| 5,682,099 A | | 10/1997 | Thompson et al. |
| 5,892,361 A | | 4/1999 | Meyer, Jr. et al. |
| 6,163,155 A | * | 12/2000 | Bittar ......................... 324/338 |
| 6,218,842 B1 | * | 4/2001 | Bittar et al. ................. 324/339 |

FOREIGN PATENT DOCUMENTS

| | | |
|---|---|---|
| EP | 0045243 A2 | 2/1982 |
| EP | 0067767 A2 | 12/1982 |
| EP | 0289418 A2 | 11/1988 |
| EP | 0368762 A2 | 5/1990 |
| GB | 2221309 A | 1/1990 |
| WO | WO 00/45195 A1 | 8/2000 |
| WO | WO 00/50925 A1 | 8/2000 |

OTHER PUBLICATIONS

The Patent Office, Patents Act 1977 Search Report Under Section 17, Jun. 13, 2002, United Kingdom (one page).
W. Hal Meyer, et al.; A New Slimhole Multiple Propagation Resistivity Tool; SPWLA 35th Annual Logging Symposium; Jun. 19–22, 1994; pp. 1–21; USA.

* cited by examiner

Primary Examiner—Jay Patidar
(74) Attorney, Agent, or Firm—Mark A. Oathout (57) ABSTRACT

The present invention is a propagation resistivity system that utilizes one or more transmitter coil antennas, or "transmitters" and at least two receiver coil antennas, or "receivers". The system uses a wellbore resistivity tool which may be embodied as a MWD tool or as a wireline tool. Two or more transmitters may be spaced equally on either side of two or more spaced-apart receivers. Two or more frequencies are transmitted and received simultaneously. Multiple frequencies may be transmitted from each transmitter or from separate transmitters at the same time. Multiple frequencies are simultaneously received and analyzed by the receiver electronics, thereby reducing the measurement time for multiple frequency measurements. In one embodiment each of two transmitters transmits simultaneously. One transmitter operates on a high frequency. The second transmitter operates at a lower frequency. The higher frequency signal penetrates a relatively shallow radial distance into the formation and the lower frequency penetrates to a radial depth which exceeds the higher frequency. Composite measurements made at two radial depths are used to compensate for factors having adverse effects on resistivity measurements in the immediate region of the borehole. Such factors include invasion, variations in borehole size, variations in borehole fluid, and the like.

26 Claims, 4 Drawing Sheets

WELLBORE RESISTIVITY TOOL WITH SIMULTANEOUS MULTIPLE FREQUENCIES

BACKGROUND OF THE INVENTION

1. Field of Invention

This invention generally pertains to well logging, and more specifically to well logging apparatus and methods for rapidly developing data for determining such formation properties as resistivity. The apparatus and methods have general applications, but are particularly well suited for measuring while drilling applications employing advanced, high speed drilling apparatus.

2. Background of the Art

Resistivity is well known parameter used in evaluating earth formations surrounding a well borehole. In the oil and gas exploration and production industry, a measure of resistivity is used to delineate hydrocarbons from saline water within pore space of earth formation penetrated by the borehole. The basic principal underlying the measurement is that for a given formation matrix, the formation containing more resistive hydrocarbon fluid within the pore space will exhibit a greater composite resistivity than the same formation containing less resistive saline liquid within the pore space.

In the evolution of the art, resistivity instruments or "tools" were originally conveyed along the wellbore by means of a wireline cable. This technique is still widely used today. Resistivity related measurements are transmitted to the surface by means of the wireline for processing, interpretation and recording. This technique is applicable only in well boreholes that have been previously drilled.

In the petroleum industry, it is economically and operationally desirable to evaluate earth formations as they are being penetrated by a drill bit, rather than waiting until the entire well has been drilled as is required in conventional wireline logging. Apparatus and methods for evaluating formations while drilling became commercially available during the 1970s. This technology, known as measurement-while-drilling (MWD) or, alternately, logging-while-drilling (LWD), now includes a wide range of formation evaluation instrumentation which is typically mounted within a drill collar or a drill string, and conveyed along the borehole by the drill string during the drilling operation. Resistivity systems are included in the suite of available MWD systems. In addition to providing timely formation resistivity measurements while the well is being drilled, MWD resistivity measurements can be more accurate than their wireline counterparts. Well boreholes are typically drilled using drilling fluids at a pressure exceeding formation pressure. Over time, drilling fluid "invades" the formation in the vicinity of the borehole thereby perturbing composite resistivity measurements made with a tool within the borehole. Invasion is minimal at the time of drilling and typically increases over time after completion of the drilling operation. MWD resistivity measurements made during the actual drilling operation are, therefore, less perturbed by invasion than wireline resistivity measurements made after the well has been drilled. Invasion, and compensation for the effects of invasion, will be discussed in more detail hereafter.

Resistivity measurement tools typically include one or more transmitter coils and one or more receiver coils. Furthermore, more than one transmission frequency is typically used. Generally speaking, multiple transmitter and receiver coils, and multiple transmission frequencies are used to obtain composite resistivity measurements from differing radial depths into the formation in order to compensate for previously-mentioned drilling fluid invasion effects, to measure a wider range of resistivities, to resolve dipping formation beds, to measure formation anisotropy variables, and to measure distance to adjacent beds in geosteering drilling operations. Propagation type resistivity systems, which measure both phase shift and attenuation of transmitted signals, are widely used in prior art MWD systems. At present, this type of system is not used for wireline measurements, but their relative low cost, small physical size and high accuracy forms an attractive addition to the wireline logging arsenal of tools.

U.S. Pat. No. 5,581,024 to Meyer, Deady and Wisler discloses a depth correction and computation apparatus and methods for combining multiple borehole resistivity measurements. U.S. Pat. No. 5,594,343 to Clark, Wu, and Grijalva discloses resistivity well logging apparatus and methods with borehole compensation including multiple transmitters asymmetrically disposed about a pair of receiving antennas. U.S. Pat. No. 5,672,971 to Meador, Meisner, Hall, Thompson and Murphy discloses a resistivity well logging system arranged for stable, high sensitivity reception of propagating electromagnetic waves. U.S. Pat. No. 5,682,099 to Thompson, Wisler, and Schneider discloses a method for bandpass sampling in MWD systems, which is applicable to multiple frequency resistivity systems. This patent is intended to be incorporated herein by reference for disclosure such as the use of transmitters and receivers to garner information on the resistivity of the formation in the region of a wellbore. U.S. Pat. No. 5,892,361 to Meyer, Thompson, Wisler, and Wu discloses the use of raw amplitude and phase in propagation resistivity measurements to measure borehole environment. U.S. Pat. No. 5,329,235 to Zhou, Hilliker and Norwood discloses a method for processing signals from a MWD resistivity logging tool to enhance vertical resolution. There are other disclosures in the art, which discuss various configurations, frequencies, and processing methods of resistivity logging tools.

In prior art systems employing multiple transmission frequencies, measurements are made sequentially using one transmitter and one frequency at a time. Because of the relatively slow drilling penetration rates of earlier MWD measurement systems, the time consuming sequential multiple frequency transmission has not presented a significant vertical depth resolution problem. The industry is, however, evolving toward more and faster MWD measurements, especially when the measurements are made when the drill stem is being removed or "tripped" from the borehole for purposes of changing a drill bit or for some other purpose. Sequential frequency transmission systems are detrimental to these faster methods. In addition, since wireline logging tools are conveyed along the borehole at a much faster rate than their MWD counterparts, sequential rather than simultaneous multiple frequency transmission is even more detrimental. No known prior art discloses a MWD resistivity logging system, which used multiple transmitter and receivers and multiple transmission frequencies that are transmitted simultaneously rather than sequentially.

SUMMARY OF THE INVENTION

In view of the prior art systems discussed above, an object of the present invention is to provide a propagation resistivity MWD logging system which employs at least two transmission frequencies transmitted simultaneously.

Another object of the present invention is to provide a MWD propagation resistivity logging system which utilizes at least two transmitters to transmit at least two different frequencies simultaneously.

Yet another object of the invention is to provide a MWD propagation resistivity logging system in which a single transmitter transmits at two different frequencies at the same time.

Still another object of the present invention is to provide a MWD propagation resistivity logging system employing at least two transmitters and two receivers which measure signals that are subsequently combined to yield phase difference and attenuation factor measurements that are compensated for adverse effect of systematic transmitter and receiver error.

Still another object of the invention is to provide a propagation resistivity measurement system that meets the above mentioned objects and that can be configured as a tool for wireline logging operations.

There are other objects and applications of the present invention that will become apparent in the following disclosure.

The present invention is a propagation resistivity system that utilizes one or more transmitter coil antennas, or "transmitters" and at least two receiver coil antennas, or "receivers". The system uses a wellbore resistivity tool or well-logging device which as illustrated may be embodied as a MWD tool, but can alternately be embodied as a wireline tool. The invention will be described using only two transmitters, two receivers, and two frequencies. Extension to three or more transmitters and/or frequencies is straight forward and would be understood by one of ordinary skill in the art. Two transmitters may be spaced equally on either side of two spaced-apart receivers. Each of the two transmitters transmits simultaneously. One transmitter operates on a high frequency, such as 2 megaHertz (MHz), which is an industry standard. The second transmitter operates at a lower frequency, which may be nominally as low as about 100 kiloHertz (kHz). The higher frequency signal penetrates a relatively shallow radial distance into the formation and the lower frequency penetrates to a radial depth which exceeds the penetration of the higher frequency. Composite measurements made at two radial depths are used to compensate for factors having adverse effects on resistivity measurements in the immediate region of the borehole. Such factors include invasion, variations in borehole size, variations in borehole fluid, and the like.

The higher frequency signal may be transmitted from the first transmitter T1, and the lower frequency signal may be transmitted simultaneously from the second transmitter T2 during a time interval $t_a$. At a later time interval $t_b$, the reverse occurs. That is, there is simultaneous transmission of the high frequency signal from transmitter T2 and the lower frequency signal from T1. Alternately, both high and low frequencies can be transmitted simultaneously from T1, and subsequently both high and low frequencies can be transmitted simultaneously from T2. In either embodiment, two frequencies are transmitted simultaneously from the tool to propagate into the formation and to produce signals, which are subsequently detected by the receivers.

Using the first transmission sequence, the high frequency or first frequency signal from T1 is received at the closer spaced receiver R1 with a phase $\phi_{111}$ measured in degrees or radians and relative to the phase of the transmitted signal (the first number after the $\phi$ indicating the transmitter from which the signal originated, the second number after the $\phi$ indicating the signal is received by the first receiver, and the third number indicating the signal is propagated at a first frequency). The high or first frequency signal from the first transmitter T1 is also received at the first receiver R1 having been attenuated relative to the transmitter signal by an amount $\alpha_{111}$ measured in decibels or nepers. The numbers after the $\alpha$ indicate the same as the three numbers after the phase. Simultaneously, phase and attenuation of the signal from transmitter T1 is received at receiver R2, at frequency 1, $\phi_{121}$ and $\alpha_{121}$. It is well known in the art that the phase difference $\phi_{121}-\phi_{111}$ and the attenuation difference $\alpha_{121}-\alpha_{111}$ are functions of formation properties and conditions in the vicinity of the borehole and receiver antennas, and may be defined as a phase difference $\Delta\phi_{11}$ and attenuation difference $\Delta\alpha 11$. In each case the first number after the $\Delta\phi$ or $\Delta\alpha$ indicates from transmitter T1 and the second number indicates at frequency 1. In particular the phase difference and attenuation difference are functions of resistivity of the formation. T2 simultaneously transmits a signal at the lower frequency, denoted by the subscript 2, which is received by R2 and by R1 thereby defining a phase difference $\Delta\phi_{22}$ and attenuation difference $\Delta\alpha_{22}$. Next in the measurement sequence T2 then transmits the high frequency, which is received at R2 and R1 and thereby defines a phase and attenuation difference $\Delta\phi_{21}$ and $\Delta\alpha_{21}$. T1 simultaneously transmits a signal at the lower frequency which is received by R1 and R2, thereby defining a phase and attenuation difference $\Delta\phi_{12}$ and $\Delta\alpha_{12}$. The terms $\Delta\phi_{11}$ and $\Delta\phi_{21}$ are combined to yield a compensated phase difference $\Delta\phi_{C1}=(\Delta\phi_{11}+\Delta\phi_{21})*\frac{1}{2}$. Similarly the terms $\Delta\alpha_{11}$ and $\Delta\alpha_{21}$ are combined to yield a compensated attenuation difference $\Delta\alpha_{C1}=(\Delta\alpha_{11}+\Delta\alpha_{21})*\frac{1}{2}$. And in like manner the terms $\Delta\phi_{12}$, $\Delta\phi_{22}$, $\Delta\alpha_{12}$, and $\Delta\alpha_{22}$ are combined to yield compensated phase difference $\Delta\phi_{C2}=(\Delta\phi_{12}+\Delta\phi_{22})*\frac{1}{2}$ and attenuation difference $\Delta\alpha_{C2}=(\Delta\alpha_{12}+\Delta\alpha_{22})*\frac{1}{2}$.

Transmission is switched from transmitter T1 to T2 and back again to transmitter T1 in the first embodiment of the invention. In the second embodiment T1 simultaneously emits high and low frequencies, and next in the measurement sequence T2 simultaneously emits high and low frequencies. Compensated values $\phi_{CH}$, $\phi_{CL}$, as well as $\alpha_{CH}$ and $\alpha_{CL}$, are computed in the same manner.

As is well known in the industry compensated values $\Delta\phi_{C1}$, $\Delta\phi_{C2}$, $\Delta\alpha_{C1}$, and $\Delta\alpha_{C2}$, are then used separately and/or combined to determine formation resistivities, and subsequently formation hydrocarbon saturation, despite the effects of invasion, borehole fluids, and systematic equipment error.

DETAILED DESCRIPTION

The resistivity tool as illustrated may be embodied as a MWD tool, or as a wireline system. Both embodiments will be disclosed.

Figure 1:
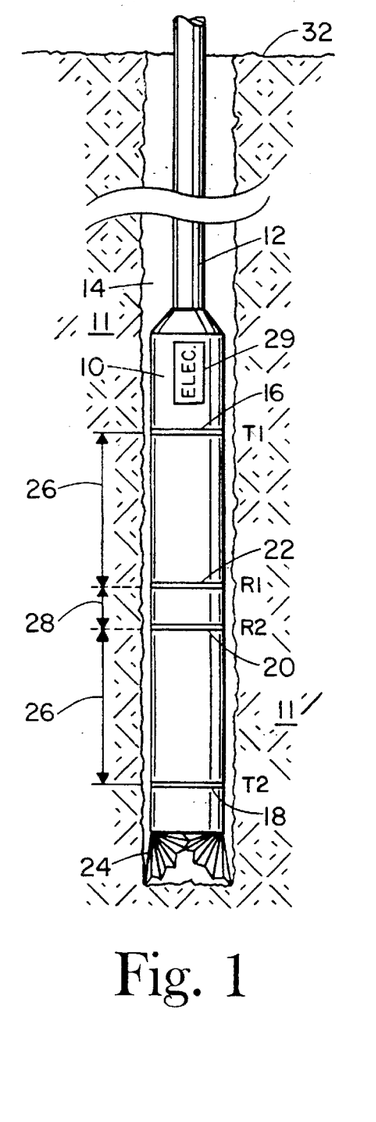
FIG. 1 shows a resistivity tool embodied as a MWD system.

FIG. 1 shows the invention embodied as a MWD system. Receivers R1 and R2, denoted at 22 and 20, respectively are spaced apart a distance 28 on the outer surface of a preferably stainless steel mandrel 10 which is typically a drill collar. Transmitters T1 and T2, denoted at 16 and 18 respectively, are equally spaced a distance 26 from receivers R1 and R2, respectively. Dimension 28 may be, for example about 6 inches (in), and dimension 26 may be, for example, about 30 in. The transmitters and receivers are powered and controlled by an electronic package 29, which is mounted within the wall of mandrel 10. The package 29 can also contain telemetry equipment to transmit measured data to the surface in real time, or to alternately record the data for subsequent playback, processing and analysis. The MWD tool is a component of a drill string which is terminated at the lower end by drill bit 24, and is conveyed along borehole 14 by drill pipe 12. Resistivity of formation 11 penetrated by borehole 14 can be measured as the drill string advances in the borehole, or as the drill string is removed or "tripped" from the borehole. The drill string is operated in a manner well known in the art using a drilling rig and associated equipment (not shown) located at the surface 32 of the earth.

Still referring to FIG. 1, one pair of transmitters T1, T2 and one pair of receivers R1, R2 are illustrated. Measured signals from the transmitters T1, T2 are processed to yield compensated measures of signal phase and attenuation at two different radial depths of investigation into the formation 11. As mentioned previously, borehole conditions and drilling fluid invasion can adversely affect such measurements in the vicinity of the borehole, and measures at multiple radial depths of investigation can be used to minimize these adverse effects. It is possible to use additional pairs of spaced transmitters to obtain additional measures at varying depths of investigation. Additional pairs of receivers can also be used to obtain additional measurements at varying vertical resolutions. A system using N/2 pairs of transmitters will be discussed in a subsequent section of the specification.

Figure 2:
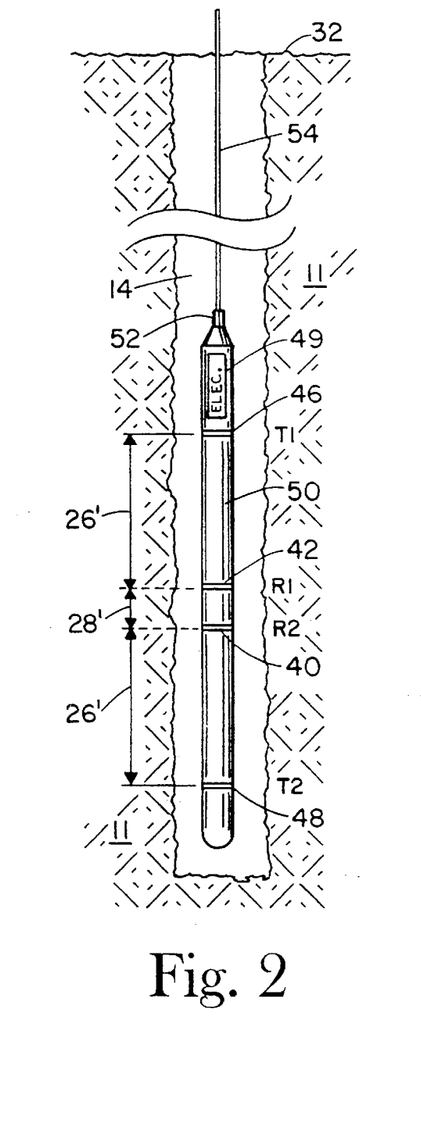
FIG. 2 shows a resistivity tool embodied as a wireline logging system.

FIG. 2 shows the system embodied as a wireline logging system. Receivers R1 and R2, denoted at 42 and 40, respectively, are spaced apart a distance 28' on the outer surface of a logging tool 50 which is typically a stainless steel pressure housing. Transmitters T1 and T2, denoted at 46 and 48, respectively, are equally spaced a distance 26' from receivers R1 and R2, respectively. Dimension 28' may be, for example, about 6 inches (in), and dimension 26' may be, for example about 30 in. Note that the transmitter and receiver spacing in the wireline embodiment of FIG. 2 are not necessarily the same as the respective spacing in the MWD embodiment shown in FIG. 1.

Referring to FIG. 2, the transmitters T1, T2 and receivers R1, R2 are powered and controlled by an electronic package 49, which is mounted within the pressure housing 50. The tool 50 is attached to a logging cable 54 by means of a cable head 52. The logging cable 54, which typically contains multiple electrical or fiber optic conductors, serves both as a communication path between the tool 50 and the surface of the earth 32, and also provides a means for conveying the tool 10 along the borehole 14 using works (not shown) at the surface of the earth. Resistivity of the formation 11 penetrated by the borehole 14 can be measured as a function of depth within the borehole which is typically measured as the tool 10 is moved up the borehole 14.

Figure 3:
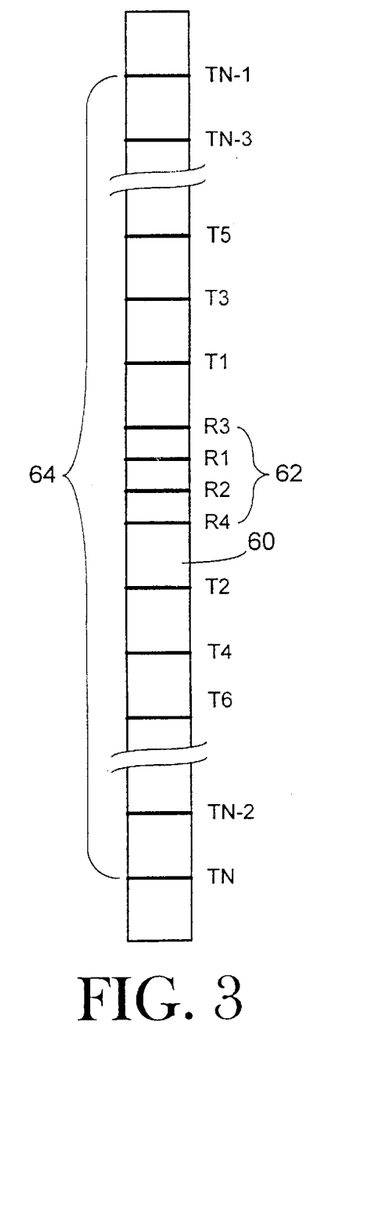
FIG. 3 shows a resistivity tool with one pair of receivers and N/2 pairs of transmitters.

FIG. 3 illustrates the resistivity tool with a plurality of transmitter pairs equally spaced about a receiver R1, R2 pair 62 on a mandrel 60 (additional receiver pairs may be added, e.g., shown as R3 and R4 and treated the same as R1 and R2). The transmitters and receivers are referenced similar to the previous discussions, with the multiple transmitter embodiment in FIG. 3 containing N/2 pairs of transmitters (where N is an even number). This yields multiple depths of investigation and additional borehole compensation. Phase and attention measurements are generally the same as with the single pair transmitter embodiment. Furthermore, systematic apparatus error correction is the same as with the single pair transmitter embodiment.

Figure 4:
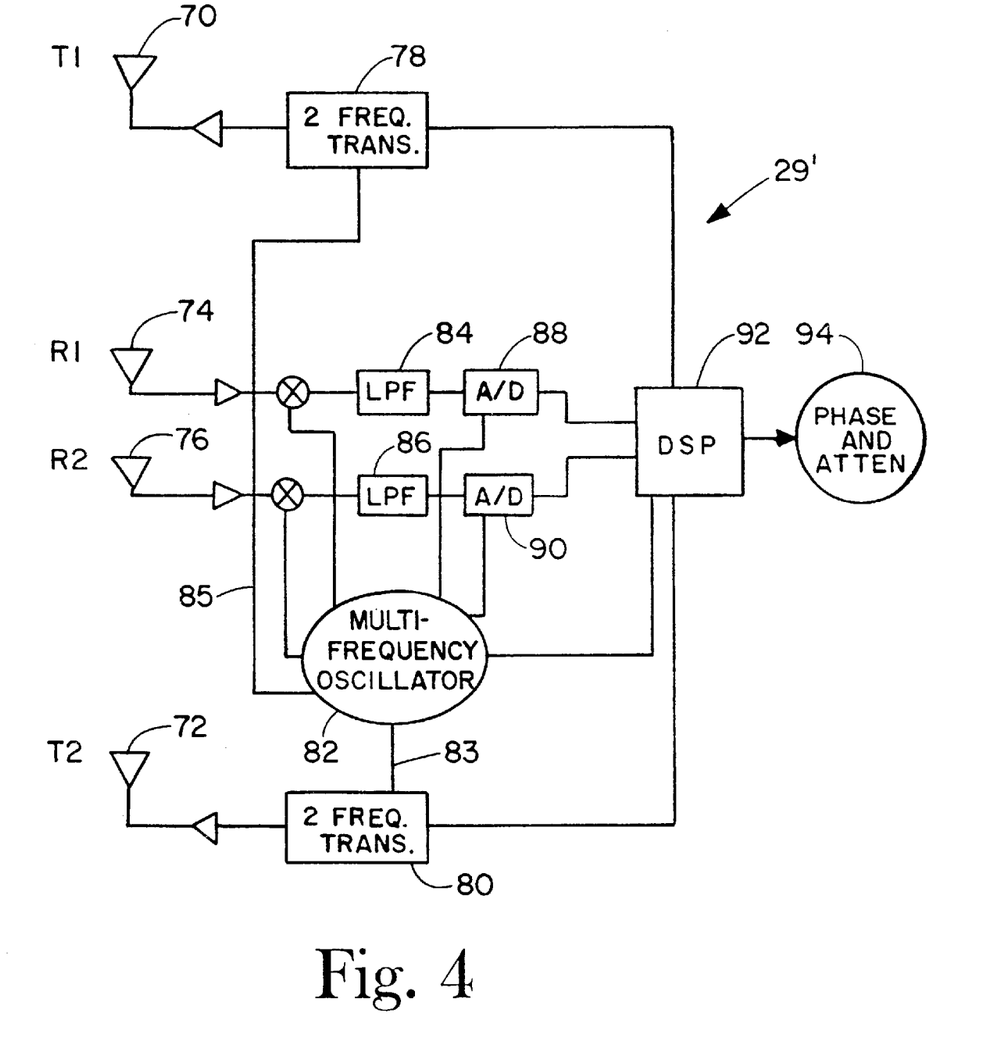
FIG. 4 shows the circuitry controlling the operation of transmitters and receivers of a resistivity tool.

FIG. 4 illustrates the basic elements of the circuitry to control the transmitters and receivers of the system, and is identified as a whole by the reference number 29'. Transmitter coils 70 and 72 (FIGS. 1–4) transmit signals having a same polarization and are provided with such signals from the frequency transmitters 78 and 80, respectively. The transmitters 78 and 80 are controlled by a digital signal processor or DSP 92. A suitable DSP 92 is AD2181 manufactured by Analog Devices. DSP's are also available from Texas Instruments. Signals received by receiver coils 74 and 76, mounted on the resistivity measuring tool in planes parallel to the plane(s) of the transmitter coil(s) 70, 72 (FIGS. 1–3), pass through filters 84 and 86, respectively, and may then be sampled by the analog to digital converters 88 and 90, respectively, at a rate at least twice the frequency of the highest frequency prior to being input into DSP 92 for separation and analysis. A multiple output oscillator circuit 82 is operatively connected to both the transmitter (e.g. via synchronization lines 83, 85) and the receiver elements of the circuit as shown in FIG. 4. The multiple output oscillator circuit 82 may, for example, have two oscillators or two numerically controlled oscillators (NCO's) where the NCO outputs are added together with a resistor network before the final output amplifier in the transmitter; or one NCO where the sum of the two sinusoids (at the two different frequencies) are put in a lookup table and then go directly to the transmitter output amplifier. The DSP output at 94 comprises compensated phase and attenuation data at two radial depths of investigation. Such data is subsequently used to determine the resistivity and finally to empirically suggest the hydrocarbon saturation within the earth formation measured.

A suitable range of electromagnetic transmission frequencies which may be used in the invention is from about 100 kHz to about 10 MHz. By way of example, the first frequency may be 2 MHz and a second frequency used in the invention may be 500 MHz.

One advantage of the present invention is that the speed at which wellbore logging occurs may be increased without sacrificing accuracy. Prior MWD systems were functional moving axially through the wellbore at speeds of about 3 ft/min or 180 ft/hour based on one 5 second sample every ¼ ft. with an accuracy of 0.5 millisiemens per meter. The present invention may be functional at higher speeds. For example speeds may be increased from 3 ft/min to at least 6 ft/min for 2 simultaneous frequency operation while maintaining a measurement accuracy of 0.5 millisiemens per meter or better, or up to at least 9 ft/min for 3 simultaneous frequency operation without sacrificing accuracy.

MATHEMATICAL FORMALISM

The following mathematical formalism and convention will be used to describe the basic measurements of the system, and the parameter compensation methods.

The signal measured at each receiver of the system is $$S = \exp(i\phi - \alpha)\exp(i\omega t) \quad (1)$$

where
- S = the measured signal;
- ⌀ = the absolute phase with respect to the transmitter;
- α = the absolute attenuation with respect to the transmitted signal; and
- ω = the angular frequency of the signal.

The two transmitters, two receivers embodiment of the invention illustrated in FIGS. 1 and 2 will be used to illustrate the operation of the system. It should be understood, however, that a plurality of transmitter pairs as illustrated in FIG. 3 can be used, and the same data processing methodology can be used to obtain the desired compensated formation parameters.

During a time period ta, transmitter T1 is turned on at frequency F1 and transmitter T2 is simultaneously turned on at frequency F2. The receivers measure eight parameters during this time interval which are $\phi_{ijk}$ and $\alpha_{ijk}$;

where i=1, 2 and denotes the reference number of the transmitter generating the signal;

j=1, 2 and denotes the reference number of the receiver receiving the signal; and k-1, 2 and denotes the frequency (1=high frequency and 2=low frequency)of the signal.

As an example, $\phi_{121}$ is the phase of the signal from T1 received at receiver R2 at frequency F1. This notion will be user throughout the following discussions.

During a subsequent time period $t_b$, transmitter T1 is turned on at frequency F2 and T2 is simultaneously turned on at frequency F1 and an additional eight parameters $\phi_{ijk}$ and $\alpha_{ijk}$ are measured. This yields a total of sixteen parameters from which compensated values of phase and attenuation are computed at two frequencies and consequently, two depths of investigation. Details of these computations will be discussed in the following section of this invention.

The steps taken in the time periods $t_a$ and $t_b$ are sequentially repeated as the logging tool is conveyed along the borehole thereby yielding a measure of parameters of interest as a function of depth within the well borehole.

Figure 5:
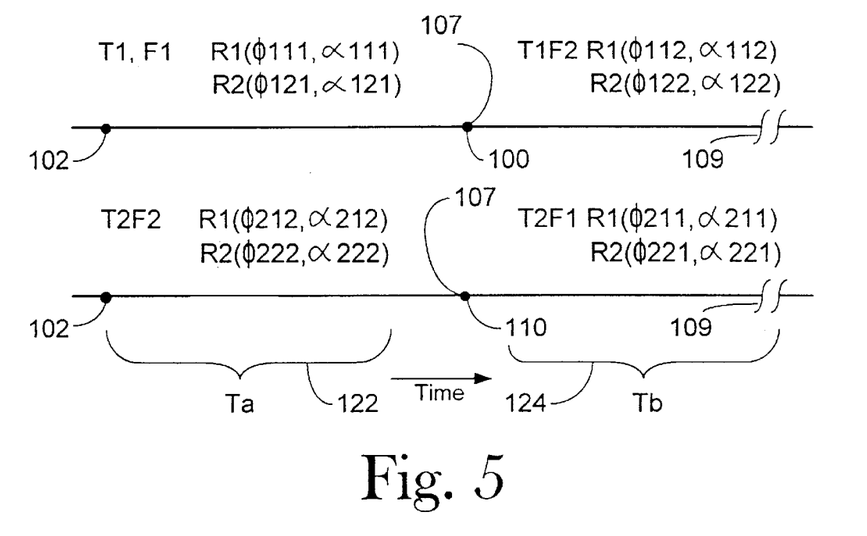
FIG. 5 is a timing diagram of a tool which simultaneously transmits two different frequencies using two transmitters.

FIG. 5 is a conceptual illustration of the timing sequence discussed above. A time line 100 represents events connected with the transmission of T1, and a time line 110 represents events connected with the transmission of T2. During the time interval $t_a$ denoted at 122, T1 is turned on at time 102 and at frequency F1. Parameters illustrated are measured during this time interval. Also during $t_a$ T2 is simultaneously turned on at frequency F2 and at time 102, and the indicated parameters are measured during this time period. During the time interval $t_b$ denoted by 124, T1 is turned on at frequency F2 at time 107 and T2 is turned on simultaneously at time 107 at frequency F1. The indicated parameters are measured during this time interval. The sequence is repeated, as indicated conceptually at 109, as the tool is conveyed along the well borehole.

Figure 6:
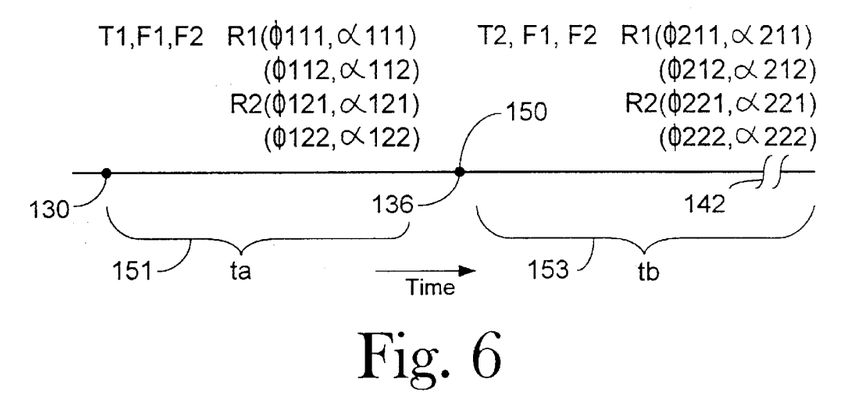
FIG. 6 is a timing diagram of a tool which simultaneously transmits two different frequencies from the same transmitter.

A time line 150 for one alternate embodiment of the invention is shown in FIG. 6. In this embodiment, multiple frequencies are transmitted simultaneously at F1 and F2 at time 130. The indicated parameters are made during time period 153. During a time interval 153, T2 transmits at time 136 simultaneously at frequencies F1 and F2. Parameters as indicated are measured during time interval 153. The sequence is repeated, as indicated conceptually at 142, as the tool is conveyed along the well borehole.

PARAMETER COMPENSATION

The present invention can be used for compensation to accomplish (a) a symmetric investigation of the formation and (b) to eliminate systematic errors. Absolute measures of φ and α are prone to error when the transmitter and receiver antennas and coils vary with the temperature and pressure as a result of operating in a borehole environment. As long as the measurement tool and the surrounding environs obey linear electromagnetic laws, the techniques of the invention can be used to correct for these "systematic" errors. A linear change in a circuit parameter will result in a phase or attenuation change in a received signal. This will result in an erroneous measure of true formation parameters, which are used to determine formation resistivity.

Compensation for systematic errors will be discussed for a single frequency for sake of brevity. The frequency indicating subscript will, therefore, be dropped from this discussion. It should be understood, however, that the same methodology is used for additional frequencies. The phase of the signal received at R1 from T1 is represented as $$\phi_{11} = \phi_{T1e} + \phi_{R1e} + \phi_{11f} \quad (2)$$

where
- $\phi_{11}$ = the measured quantity;
- $\phi_{T1e}$ = a phase error for transmitter T1;
- $\phi_{R1e}$ = a phase error for receiver 1; and
- $\phi_{11f}$ = the formation effect which is the parameter of interest.

Using the same notation convention, similar expression from equation (2) can be developed for measured quantities $\phi_{12}$, $\phi_{21}$, and $\phi_{22}$. The phase $\phi_{c1}$, which is the phase at the specific frequency 1 and corrected for transmitter and receiver error, is $$\phi_{c1} = (\phi_{12} - \phi_{11} + \phi_{21} - \phi_{22})/2 \quad (3)$$

Substituting the set of equations represented by equation (2) into equation (3) yields $$\phi_{c1} = ((\phi_{12f} + \phi_{t1e} + \phi_{r2e}) - (\phi_{11f} + \phi_{t1e} + \phi_{r2e}) + (\phi_{21f} + \phi_{t2e} + \phi_{r1e}) - (\phi_{22f} + \phi_{t2e} + \phi_{r2e}))/2$$

Which reduces to:

$$\phi_{c1} = (\phi_{12f} + \phi_{11f} + \phi_{21f} - \phi_{22f})/2 \quad (4)$$

where all error terms have canceled out.

Similar expressions can be developed for a compensated amplitude value αci at frequency i by substituting each phase value in set of equations (3) for a corresponding amplitude value using the notation convention developed throughout this disclosure. The invention, therefore, provides apparatus and methods for obtaining phase and amplitude parameters, which have been compensated for adverse effects of systematic errors. In addition, compensated values for these parameters at two or more frequencies can be obtained thereby yielding compensated parameters of interest at varying radial depths of investigation into the formation. These compensated parameters are then combined to yield formation resistivity values in which the adverse effects of formation fluid invasion and borehole perturbations have been reduced.

COMPENSATED RESISTIVITY METHODOLOGY

Figure 7:
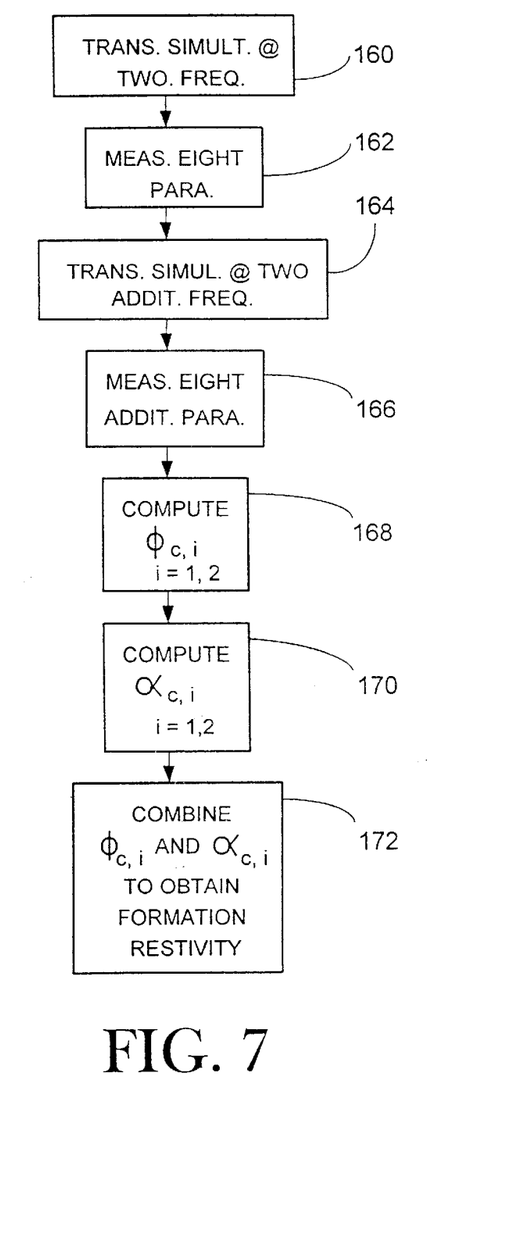
FIG. 7 is a flow chart for the method of measuring phase and amplitude parameters, compensating these measurements for systematic transmitter and receiver error, and combining compensated phase and amplitude measurements made at multiple frequencies to obtain formation resistivity.

FIG. 7 is a flow chart summarizing the methodology of the compensated resistivity logging system. Transmitters transmit two frequencies simultaneously at block or step 160. Receivers record the transmissions and yield eight independent absolute parametric measurements at step 162. Transmitters again transmit simultaneously at two frequencies at step 164. An additional eight independent parametric measurements are made with the receiver array at step 166. Compensated phase values are computed for two different frequencies at step 168 using the parametric measurements. Compensated phase and attenuation measurements are combined at step 172 to obtain a value of formation resistivity, which is the parameter of interest used to compute hydrocarbon saturation of a logged formation.

While the foregoing is directed to the various embodiments, the claims are intended to cover the invention as broadly as legally possible in whatever form it may be utilized.

What is claimed is:

1. A method for measuring resistivity in at least two regions surrounding a wellbore using a wellbore resistivity measuring tool, comprising:

simultaneously transmitting at least two independent electromagnetic signals having a same polarization at a plurality of selected frequencies and having different depths of investigation;

wherein said step of simultaneously transmitting at least two independent electromagnetic signals consists of transmitting the independent electromagnetic signals from a single transmitter;

receiving each of the at least two independent electromagnetic signals at a minimum of a first receiver and a second receiver; and determining at least one parameter in each of the regions using the at least two independent electromagnetic signals which have been received.

2. The method according to claim 1 wherein said step of receiving each of the at least two independent electromagnetic signals at a minimum of a first receiver and a second receiver consists of receiving each of the at least two independent electromagnetic signals at two receivers.

3. The method according to claim 1, wherein said step of simultaneously transmitting at least two independent electromagnetic signals comprises transmitting each of the independent electromagnetic signals from a first transmitter and from a second transmitter.

4. The method according to claim 1, wherein said step of simultaneously transmitting at least two independent electromagnetic signals comprises transmitting one of the independent electromagnetic signals having a first frequency from a first transmitter and transmitting another of the independent electromagnetic signals at a second frequency from a second transmitter.

5. The method according to claim 1, wherein said step of simultaneously transmitting at least two independent electromagnetic signals comprises transmitting the independent electromagnetic signals from at least four transmitters.

6. The method according to claim 1, wherein said step of simultaneously transmitting at least two independent electromagnetic signals comprises transmitting each of the electromagnetic signals at a discrete frequency within the range of about 100 kHz to about 10 MHz.

7. The method according to claim 1, further including the step of measuring resistivity at varying vertical resolutions by adding at least one pair of receivers to the wellbore resistivity measuring tool.

8. The method according to claim 1, wherein said step of simultaneously transmitting at least two independent electromagnetic signals comprises transmitting a first electromagnetic signal at a frequency of about 2 MHz and transmitting a second electromagnetic signal at a frequency of about 500 kHz.

9. A method for measuring resistivity in at least two regions surrounding a wellbore using a wellbore resistivity measuring tool, comprising:

moving the wellbore resistivity measuring tool in an axial direction through the wellbore at a speed greater than 3.5 ft./min with a measurement accuracy of at least 0.5 millisiemens per meter;

simultaneously transmitting at least two electromagnetic signals having a same polarization at a plurality of different frequencies and having different depths of investigation;

receiving each of the at least two electromagnetic signals at a minimum of a first receiver and a second receiver; and determining at least one parameter in each of the regions using the at least two electromagnetic signals which have been received.

10. A method for measuring resistivity in at least two regions surrounding a wellbore using a wellbore resistivity measuring tool, comprising:

simultaneously transmitting at least two electromagnetic signals having a same polarization at a plurality of different frequencies and having different depths of investigation;

wherein said step of simultaneously transmitting at least two independent electromagnetic signals consists of transmitting the independent electromagnetic signals from a single transmitter;

receiving each of the at least two electromagnetic signals at a minimum of a first receiver and a second receiver; and determining at least one parameter in each of the regions using the at least two electromagnetic signals which have been received wherein said step of determining the parameter of the regions includes processing the at least two electromagnetic signals which have been received in a control system to yield a compensated phase difference and a compensated attenuation difference.

11. A method for measuring resistivity in at least two regions surrounding a wellbore using a wellbore resistivity measuring tool, comprising:

spacing a first transmitter and a second transmitter equally about a respective first receiver and a respective second receiver;

simultaneously transmitting each of two independent electromagnetic signals having a same polarization at selected frequencies from the first transmitter and from the second transmitter and having different depths of investigation;

receiving each of the independent electromagnetic signals at the first receiver and at the second receiver; and determining at least one parameter in each of the regions using the independent electromagnetic signals which have been received.

12. The method according to claim 11, further including the step of measuring resistivity at varying vertical resolutions by adding at least one pair of receivers to the wellbore resistivity measuring tool.

13. A method for measuring resistivity in at least two regions surrounding a wellbore using a wellbore resistivity measuring tool, comprising:

simultaneously transmitting each of two electromagnetic signals having a same polarization at different frequencies and having different depths of investigation;

wherein said step of simultaneously transmitting at least two independent electromagnetic signals consists of transmitting the independent electromagnetic signals from a single transmitter and wherein said step of simultaneously transmitting each of two electromagnetic signals having a same polarization at different frequencies and having different depths of investigation comprises transmitting each of the electromagnetic signals at a frequency within the range of about 100 kHz to about 10 MHz;

receiving each of the electromagnetic signals at a first receiver and at a second receiver; and determining at least one parameter in each of the regions using the electromagnetic signals which have been received.

14. A method for measuring resistivity in at least two regions surrounding a wellbore using a wellbore resistivity measuring tool, comprising:

moving the wellbore resistivity measuring tool in an axial direction through the wellbore at a speed greater than 6 ft./min with a measurement accuracy of at least 0.5 millisiemens per meter;

simultaneously transmitting each of two electromagnetic signals having a same polarization at different frequencies and having different depths of investigation;

wherein said step of simultaneously transmitting at least two independent electromagnetic signals consists of transmitting the independent electromagnetic signals from a single transmitter;

receiving each of the electromagnetic signals at a first receiver and at a second receiver; and determining at least one parameter in each of the regions using the electromagnetic signals which have been received.

15. A method for measuring resistivity in at least two regions surrounding a wellbore using a wellbore resistivity measuring tool, comprising:

simultaneously transmitting each of two electromagnetic signals having a same polarization at different frequencies and having different depths of investigation;

wherein said step of simultaneously transmitting at least two independent electromagnetic signals consists of transmitting the independent electromagnetic signals from a single transmitter;

receiving each of the electromagnetic signals at a first receiver and at a second receiver; and determining at least one parameter in each of the regions using the electromagnetic signals which have been received wherein said step of determining the parameter in each of the regions includes processing the at least two electromagnetic signals which have been received in a control system to yield a compensated phase difference and a compensated attenuation difference.

16. A wellbore resistivity measuring tool, comprising:

a circuit mounted on the resistivity measuring tool including a means for generating a plurality of independent signals having different depths of investigation each having a selected frequency;

at least one transmitter coil mounted on the resistivity measuring tool in a first plane and connected to the circuit including a means for simultaneously transmitting the plurality of independent signals wherein the plurality of independent signals have a same polarization; and at least two receivers coils mounted on the resistivity measuring tool in two respective planes parallel to the first plane, each of the receiver coils including a means for receiving each of the plurality of independent signals.

17. The apparatus according to claim 16 wherein the circuit including said means for generating the plurality of independent signals each at the selected frequency includes a multiple output oscillator circuit.

18. The apparatus according to claim 16 wherein said at least one transmitter comprises at least two transmitters.

19. The apparatus according to claim 18 wherein the circuit includes a means for combining and transmitting the plurality of independent signals.

20. The apparatus according to claim 16 wherein the wellbore resistivity measuring tool comprises a measuring while drilling tool.

21. The apparatus according to claim 16 wherein the wellbore resistivity measuring tool comprises a wireline tool.

22. The apparatus according to claim 16 wherein the plurality of independent signals comprise a plurality of sine wave signals.

23. The apparatus according to claim 16 wherein the selected frequency is a discrete frequency selected from a range of frequencies from about 100 kHz to about 10 MHz.

24. The apparatus according to claim 16 wherein said at least one transmitter consists of a first transmitter.

25. The apparatus according to claim 24 wherein the circuit includes a means for combining and transmitting the plurality of independent signals.

26. A wellbore resistivity measuring tool, comprising:

a means mounted on the resistivity measuring tool consisting of a single transmitter for simultaneously transmitting a plurality of independent signals having a same polarization each having a selected frequency and having different depths of investigation;

said transmitting means consisting of a single transmitter; and at least two receivers mounted on the resistivity measuring tool, each of the receivers including a means for receiving each of the plurality of independent signals.

* * * * *